United States Patent [19]
Böhm et al.

[11] 4,252,868
[45] Feb. 24, 1981

[54] FUEL CELL CONSTRUCTION AND METHOD OF MANUFACTURING A FUEL CELL

[75] Inventors: Harald Böhm, Glashütten; Robert Fleischmann, Hösbach; Jochen Heffler, Grossauheim, all of Fed. Rep. of Germany

[73] Assignee: Licentia Patent Verwaltung GmbH, Frankfurt, Fed. Rep. of Germany

[21] Appl. No.: 16,071

[22] Filed: Feb. 28, 1979

[30] Foreign Application Priority Data

Mar. 7, 1978 [DE] Fed. Rep. of Germany ....... 2809815

[51] Int. Cl.³ .............................................. H01M 8/08
[52] U.S. Cl. ........................................ 429/41; 429/44; 429/46; 29/623.1
[58] Field of Search ................... 429/44, 45, 46, 41; 29/623.1

[56] References Cited

U.S. PATENT DOCUMENTS

| 3,346,421 | 10/1967 | Thompson et al. | 429/44 |
| 3,453,149 | 7/1969 | Aldhart et al. | 429/46 |
| 3,575,718 | 4/1971 | Adlhart et al. | 429/46 |
| 3,694,310 | 9/1972 | Emanuelson et al. | 429/41 |
| 3,719,528 | 3/1973 | Grasselli et al. | 429/46 |
| 4,017,664 | 4/1977 | Breault | 429/44 |

FOREIGN PATENT DOCUMENTS 2417447 10/1975 Fed. Rep. of Germany .

Primary Examiner—Donald L. Walton
Attorney, Agent, or Firm—McGlew & Tuttle

[57] ABSTRACT

A fuel cell is provided which comprises a matrix layer of an electrolyte in a material which chemically and physically absorbs the electrolyte, such as a polyester fiber bonded with phenol formaldehyde resin. A porous anode electrode and a porous cathode electrode are arranged at respective sides of the matrix layer. The electrolyte comprises polyphosphoric acid. At least one of the electrodes comprises an additional electrolyte carrier, for example, a tungsten carbide electrode having pores which contain a polyphosphoric acid. A method is also disclosed for forming the cell from a matrix of a plurality of fiber materials and using a polymeric binder for the materials. The matrix is dipped in a polyphosphoric acid so that a reaction takes place between the acid and the polymer fiber. The cathode and the anode are arranged on respective sides of the matrix and stacking together. An anode of tungsten carbide material is used, having a portion which also carries the electrolyte in the pores thereof. The method includes treating the tungsten carbide electrode with a polyphosphoric acid to permit it to penetrate into the pores of the tungsten carbide electrode.

23 Claims, 2 Drawing Figures

FUEL CELL CONSTRUCTION AND METHOD OF MANUFACTURING A FUEL CELL

FIELD AND BACKGROUND OF THE INVENTION

This invention relates to the construction of fuel cells in general and, in particular, to a new and useful fuel cell and method of making a fuel cell which comprises a matrix layer of an electrolyte in a material chemically and physically absorbing the electrolyte with a porous anode electrode and a porous cathode electrode arranged at respective sides of the matrix layer and, wherein, electrolyte comprises polyphosphoric acid and, wherein, at least one of the electrodes comprises an additional electrolyte carrier.

DESCRIPTION OF THE PRIOR ART

A fuel cell is already known which has a porous anode electrode, a porous cathode electrode and an electrolyte- containing matrix layer in between, wherein, the matrix layer consists of a sulfonated polystyrene or polyethylene layer containing sulfuric acid as an electrolyte. The electrolyte is chemically and physically absorbed, and the surface of the matrix layer moves, due to its swelling capacity, into the structured surface of the anode and cathode layer bearing under pressure. For purposes of sulfonating the matrix, fuming sulfuric acid is used, with sulfonic acid groups being formed. Since fuming sulfuric acid is used in excess, this excess remains as a free electrolyte enclosed in the matrix. See German Patent Disclosure DOS No. 24 17 447.

SUMMARY OF THE INVENTION

The present invention provides a fuel cell with increased output and stability at temperatures of up to about 150° C. In accordance with the invention, a fuel cell is provided which comprises a matrix layer of an electrolyte in a material which chemically and physically absorbs the electrolyte, such as a polyester fiber bonded with phenol formaldehyde resin. A porous anode electrode and a porous cathode electrode are arranged at respective sides of the matrix layer. The electrolyte comprises polyphosphoric acid. At least one of the electrodes comprises an additional electrolyte carrier, for example, a tungsten carbide electrode having pores which contain a polyphosphoric acid.

An advantage of the invention is that a fuel cell and a battery constructed with the inventive parts have an increased long term stability, excellent gas- tightness and improved efficiency.

Accordingly, an object of the present invention is to provide a fuel cell comprising a matrix layer which comprises an electrolyte and a material chemically and physically absorbing the electrolyte and including a porous anode electrode and a porous cathode electrode arranged at the respective sides of the matrix layer and, wherein, the electrolyte comprises polyphosphoric acid and at least one of the electrodes comprises an additional electrolyte carrier.

A further object of the invention is to provide an improved method of forming a battery in which a matrix, for example, of polyester fiber, is bonded with phenol formaldehyde resin, is dipped into a polyphosphoric acid and wetted so as to form an ion- conducting matrix layer comprising assembling the layer with an anode and a cathode at respective sides thereof and compressing the assembly so as to form a gas-tight ion-conducting matrix layer which no longer changes its compressibility when it is assembled with the electrode and, wherein, the anode is formed of a tungsten carbide electrocatalyst having a thickness of about 1 mm which also forms an electrolyte carrier and, wherein, the tungsten carbide electrode is treated with a polyphosphoric acid so that the electrolyte penetrates into the pores thereof.

Another object of the invention is to provide a fuel cell which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENT

Figure 1:
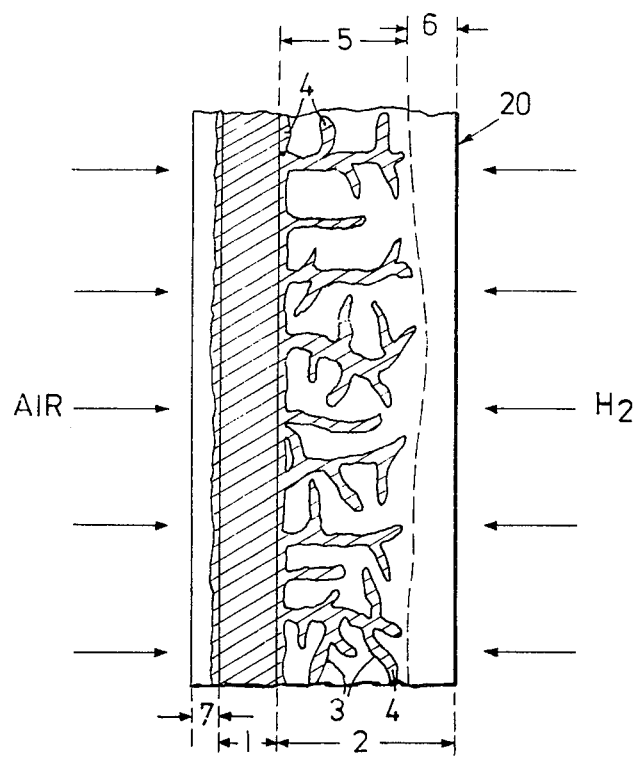
FIG. 1 is a schematic representation of a fuel cell constructed in accordance with the invention.
Figure 2:
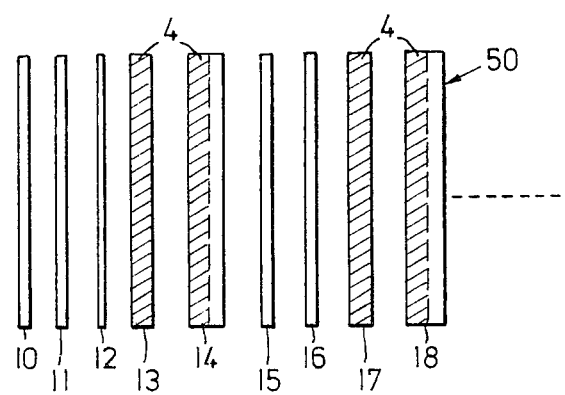
FIG. 2 is a schematic sectional representation of a battery constructed in accordance with the invention.

Referring to the drawing in particular, the invention embodied therein in FIG. 1 comprises, a fuel cell, generally designated 20, and, in FIG. 2, comprises a battery 50, which are formed in accordance with the present invention.

An increased output of a fuel cell with acid electrolyte can be achieved by increasing the operating temperature. It has been found that no equilibrium between water and acid content is established in the known electrolyte matrix layer, at temperatures over 100° C. so that the concentration of sulfuric and sulfonic acid achieved is too high. The concentration should not be higher than 50% to 60%, otherwise, the sulfuric acid becomes highly oxidizing and destroys the electrocatalyst tungsten carbide of the anode electrode, as well as the other cell components. With this electrocatalyst, there are also great fluctuations in the catalytic activity with the use of sulfuric acid as electrolyte and operating temperatures of about 60° C. to 80° C.

Tests have shown that phosphoric acid used as an electrolyte shows the same unfavorble behavior as sulfuric acid at the same operating temperatures of 60° C. to 80° C. Surprisingly, however, it was found that phosphoric acid has practically no oxidizing effect at temperatures of about 150° C., and that the electrocatalyst tungsten carbide is extremely stable despite the higher concentration, so that all fluctuations in the catalytic activity are eliminated. An even better result regarding the stability is achieved with polyphosphoric acid as an electrolyte.

In accordance with the invention, a fuel cell 20 includes an electrolyte matrix 1, according to FIG. 1, comprised, for example, of polyester fibers bonded with phenol formaldehyde resin. Both substances react somewhat, forming a compound with the polyphosphoric acid used as an electrolyte. A gas-tight, ion-conducting matrix layer is obtained which no longer changes its compressibility after it has been assembled with the electrodes. The polymer fiber matrix is dipped into 116% polyphosphoric acid, related to $H_3PO_4$, and wetted for 3 to 20 hours at room temperature up to 120° C. A reaction process takes place between acid and polymer fiber during the operating of the fuel cell at about 150° C. At this temperature, the polyphosphoric acid forms chains with a molecular weight of up to 10,000, and also has a high viscosity at temperatures of about 150° C., with excellent tightness properties, so that it stays reliably in the porous matrix and running out of the acid is avoided.

PRODUCTION AND TREATMENT METHODS OF THE MATRIX

EXAMPLE 1.

A polymer fiber layer is wetted at room temperature with polyphosphoric acid. After 20 hours, the excess acid is stripped off and the saturated polymer fiber layer is placed between the anode and the cathode. These combinations are then stacked up to 40 times.

EXAMPLE 2.

The corresponding polymer fiber layer is treated for eight hours at 120° C. with polyphosphoric acid. A reaction takes place between acid and fiber. The excess acid is then likewise stripped off and the products are stacked. A hard matrix layer is obtained which is neither deformed nor destroyed by the pressure appearing in the assembly of cells to a battery.

Apart from polyester fibers, the following substances can be used as matrix material:

Polyethylene, polyfluorethylene fabrics and polyimide fibers, as well as organic oxides with polymeric binders like polyethylene or polyfluorethylene.

The anode electrode 2 of the fuel cell 20, according to FIG. 1, has tungsten carbide as an electrocatalyst. As can be seen from the above-mentioned patent, the anode electrode has a thickness of under 0.5 mm to obtain low diffusion inhibitions. However, effective tungsten carbide electrodes must have a thickness of about 0.5 to 1 mm, since the electrocatalyst tungsten carbide shows adsorption inhibition on hetergeneous WCO structures, many adsorption centers are necessary or in depth, cooperation between electrolyte and catalyst.

Accordingly, the tungsten carbide electrode, according to the invention, has a thickness of about 1 mm and is used as an additional electrolyte carrier with very high capillary forces, so that the polyphosphoric acid can practically not be flushed out. The capillary forces of pores 3 filled with electrolyte, which have a radius of less than 0.1 mm, keep polyphosphoric acid 4 safely in pores 3, even at temperature of 150° C., and thus prevent the acid from running out. A tungsten carbide electrode is first treated with polyphosphoric acid.

Penetration of polyphosphoric acid into tungsten carbide electrode 2 reduces inhibited diffusion. Accordingly, matrix layer 1 can be made thin with a thickness of about 0.01 to 0.4 mm, preferably about 0.2 mm. The ionic conductivity is thus increased.

As can be seen from FIG. 1 polyphosphoric acid 4 penetrates relatively far into tungsten carbide electrode 2, so that part 5 of electrode 2 acts as an electrolyte reservoir, while the remaining part 6 of electrode 2 is the diffusion layer for hydrogen. The electrolyte volume in electrode 2 is preferably equal to, or greater than, that of matrix layer 1.

The use of the relatively thick tungsten carbide electrode 2 as an electrolyte reservoir results in a better stability of the system, a simpler establishment of the acid equilibrium and the greater amount of acid available results in a simpler maintenance of the equilibrium in operation, particularly, in a change of load.

PRODUCTION AND TREATMENT METHODS OF TUNGSTEN CARBIDE ELECTRODE EXAMPLE

Tungsten carbide with a particle size of about 0.01 to 0.1 $\mu$m is mixed with 15% by weight PTFE binder, rolled to layers of about 0.2 to 1 mm, and sintered with a hydrophobic back layer. The wetting with polyphosphoric acid is effected for 20 hours at 150° C. The excess acid is then stripped off, and the stacking is effected as decribed for the polymer fiber layers.

Cathode 7 is a known platinum-doped carbon electrode with a thickness of about 0.1 mm which remains unwetted.

In the operation of a cell with $H_2$ air or $CO/H_2/$ air at temperatures between 120° C. and 180° C. and production of $H_2O$, the system polyphosphoric acid matrix and tungsten carbide electrode partly filled with polyphosphoric acid maintains an equilibirum between acid concentration, activity zone (three-phase zone), and the gas-tightness is maintained under streaming gas.

Operation of a fuel cell at temperatures between 100° C. and 150° C. yields to two- to three-fold power increase, compared to a fuel cell according to the abovementioned patent operated at about 60° C.

FIG. 2 shows the principal structure of a fuel cell battery, generally designated 50, wherein only the first cell is indicated. The battery 50 comprises a shunt plate 10 which consists of graphite mixed with binders. It is followed by a gas-conducting plate 11, also of graphite, with crossing gas channels for air (not shown). The plate 11 is followed by a platinum-doped carbon cathode 12 which is followed by a matrix 13 containing polyphosphoric acid 4 which, in turn, is followed by a tungsten carbide anode electrode 14, partly filled with polyphosphoric acid 4, which is followed by a graphite gas-conducting plate 15 with gas channels for air and $H_2$. This is followed by another cathode electrode 16, then by an electrolyte matrix 17 and an anode electrode 18, partly containing electrolyte, etc. These elements are held together by end plates and connecting screw bolts, which have not been shown.

While a specific embodiment of the invention has been shown and described in detail to illustrate the application of the principles of the invention, it will be understood that the invention may be embodied otherwise without departing from such principles.

What is claimed is:

1. A fuel cell, comprising, a matrix layer of an electrolyte and a material chemically and physically adsorbing the electrolyte, a porous anode electrode and a porous cathode electrode arranged at respective sides of said martrix layer, said electrolyte comprising polyphosphoric acid, at least one of said electrodes comprising an additional electrolyte carrier.

2. A fuel cell, as claimed in claim 1, wherein said matrix layer comprises a plurality of polymer fibers with phenol resin binders so that the pores therein are of a size from between 0.1 and 0.3 $\mu$m.

3. A fuel cell, as claimed in claim 1, wherein said anode electrode is a tungsten carbide electrode having an electrolyte adsorbing part facing the matrix and an additional part forming a diffusion layer.

4. A fuel cell, as claimed in claim 3, wherein said electrolyte volume in the electrode is equal to, or greater than, the matrix layer.

5. A fuel cell, as claimed in claim 1, wherein said cathode which is arranged on one side of said matrix comprises a platinum-doped carbon electrode, said anode on the opposite side of said matrix comprising a tungsten carbide material having a portion with pores which contain electrolyte and an outer portion providing a diffusion layer for hydrogen.

6. A fuel cell, as claimed in claim 1, wherein there are a multiplicity of combinations of matrix with an anode and cathode on respective sides thereof arranged in a stack having a carbon cathode on one side of a gas-conducting plate adjacent the carbon cathode and a plate of graphite material over the gas-conducting plate.

7. A method of forming a fuel cell, comprising, forming a matrix of a plurality of fiber materials and using a polymeric binder for the materials, dipping the matrix in a polyphosphoric acid so that a reaction takes place between the acid and the polymer fiber during its operation as a fuel cell, arranging a cathode and an anode on respective sides of the matrix and stacking them together the using an anode of tungsten carbide material having a portion which also carries the electrolyte in the pores thereof and including treating the tungsten carbide electrode with a polyphosphoric acid to permit it to penetrate into the pores of the tungsten carbide electrode.

8. A method of forming a fuel cell, as claimed in claim 7, wherein the tungsten carbide electrode is of a thickness of about 1 mm and wherein the matrix layer can be made with a thickness of from about 0.01 mm to 0.4 mm.

9. A fuel cell, as claimed in claim 1, wherein said matrix layer includes polyester fiber bonded with phenol formaldehyde resin.

10. A fuel cell, as claimed in claim 9, wherein said porous anode electrode is a tungsten carbide electrode having pores which contain polyphosphoric acid.

11. A fuel cell, as claimed in claim 10, wherein said polyphosphoric acid is 116% polyphosphoric acid.

12. A fuel cell, as claimed in claim 1, wherein said matrix layer includes a polymeric binder and a material selected from the group consisting of polyethylene, polyfluoroethylene fabrics and polyimide fibers.

13. A fuel cell, as claimed in claim 1, wherein said matrix layer has a thickness of about 0.01 to 0–4 mm, and said porous anode electrode is a tungsten carbide electrode having a thickness of about 0.5 to 1 mm including pores having a radius of less than 0.1 mm containing polyphosphoric acid.

14. A fuel cell, as claimed in claim 13, wherein said matrix layer has a thickness of about 0.2 mm and said tungsten carbide electrode has a thickness of about 1 mm.

15. A fuel cell comprising a porous anode electrode, a porous cathode electrode, an electrolyte, a material chemically and physically adsorbing said electrolyte to form a porous matrix, said matrix being disposed intermediate said porous anode electrode and said porous cathode electrode arranged at respective sides thereof, said electrolyte being polyphosphoric acid, and at least one of said porous anode electrode and said porous cathode electrode having a first portion adjacent said matrix which comprises a carrier of additional electrolyte.

16. A fuel cell as claimed in claim 15, wherein said matrix includes polymer fibers and phenol resin binding said fibers.

17. A fuel cell as claimed in claim 16, wherein said matrix includes a plurality of pores having a size ranging between 0.1 and 0.3 micrometers.

18. A fuel cell as claimed in claim 15, wherein said at least one of said porous anode electrode and said porous cathode electrode includes a second portion comprising a diffusion layer, and said first portion is tungsten carbide electrode.

19. A fuel cell as claimed in claim 17, wherein said at least one of said porous anode electrode and said porous cathode electrode includes a second portion comprising a diffusion layer, and said first portion is tungsten carbide electrode.

20. A fuel cell as claimed in claim 15, wherein the volume of electrolyte in said carrier is equal to, or greater than, the volume of electrolyte in said matrix.

21. A fuel cell as claimed in claim 19, wherein the volume of electrolyte in said carrier is equal to, or greater than, the volume of electrolyte in said matrix.

22. A fuel cell as claimed in claim 15, wherein said matrix is gas-tight.

23. A fuel cell as claimed in claim 22, wherein said matrix has a fixed compressibility intermediate said porous anode electrode and said porous cathode electrode.

* * * * *